2,807,652
Patented Sept. 24, 1957

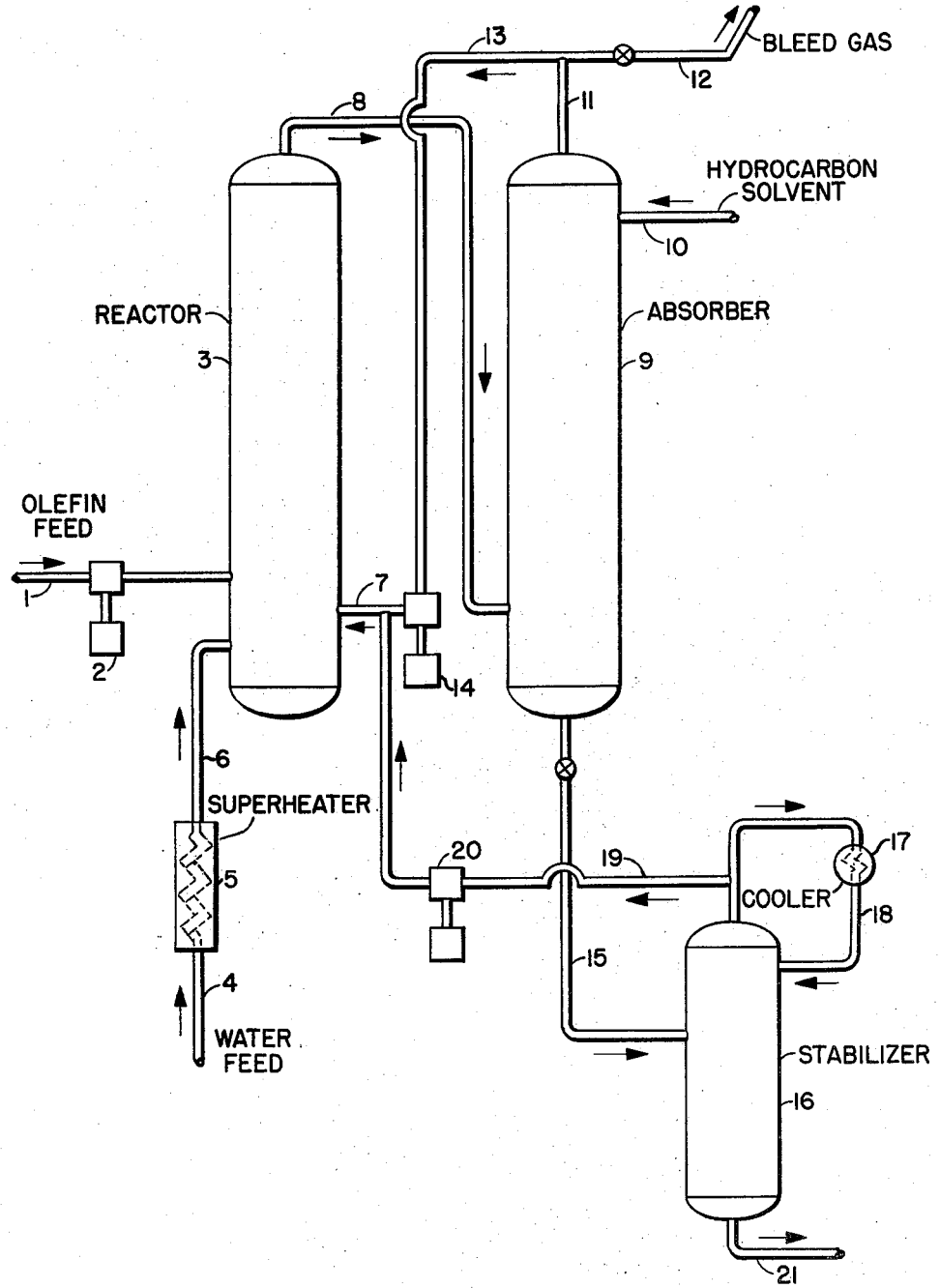

2,807,652

ETHER PREPARATION AND RECOVERY FROM DIRECT HYDRATION OF OLEFINS

E. Wendell Carrier, Cranford, N. J., assignor to Esso Research and Engineering Company, a corporation of Delaware Application November 1, 1955, Serial No. 544,216

5 Claims. (Cl. 260—614)

This invention is concerned with the preparation of an ether, particularly diisopropyl ether, by olefin hydration and an efficient separation of products using a hydrocarbon solvent at elevated temperatures and pressures.

Desired ethers can be synthesized directly in a vapor phase reaction of a $C_2$ to $C_4$ olefin with water at elevated temperatures and pressures in the presence of solid or liquid catalysts. To produce the ether selectively rather than the alcohol, it is desirable to feed a high ratio of olefin to water, though the high olefin feed ratio tends to result in a low conversion of olefin during the hydration. With the low conversion of olefin, the ether, alcohol and polymer products formed are obtained as a complex vapor mixture with the unreacted portion of the feed gases which may contain also inert hydrocarbon diluents.

In accordance with the present invention, it has been found that the olefin hydration to ether can be improved with a special absorption recovery of the ether from the vapor mixture discharged from the reaction zone. This recovery step is important because large amounts of unreacted olefins are to be separated and recycled to the reaction zone in order to obtain practical utilization of the raw material.

The conventional way of recovering products from an olefin hydration involves cooling the vapor product mixture to a relatively low temperature in order to condense a substantial part of the ether, alcohol and hydrocarbon oil products together with a substantial amount of the residual water vapor. Such an operation is unsuitable at low olefin conversion levels because large heat losses are incurred by the vapor mixture in cooling to condensing temperatures. In the prior art processes, to effect recycling of unreacted olefin, substantial heating would be required due to this cooling operation, to maintain proper heat balance and hydration temperatures.

Using the present invention, close control of the operation is obtained so that higher yields of ether are obtained with heat economy. These objects are attained by scrubbing the complex vapor product mixture with a mixture of liquid hydrocarbons which can be relatively volatile, such as motor or aviation gasoline base stocks. It is possible by adjusting the quality and quantity of the hydrocarbon solvent supplied to the high pressure scrubber to obtain a hydrocarbon extract that has a very satisfactory quantity of ether, alcohol and polymer for imparting high antiknock value to fuel blends.

If purified or technical grades of the ether product are desired, the hydrocarbon solution of the ether withdrawn from the scrubber may be fractionated to effect the purification. For this purpose the hydrocarbon solvent should preferably have a boiling range of about 200° F. to 300° F., and may be recycled to the scrubbing zone from a purification tower where the ether is distilled.

Olefins containing from 2 to 4 carbon atoms, e. g., ethylene, propylene, butylenes and mixtures thereof may comprise the reactants of the instant process. The reaction conditions will vary somewhat depending on the particular olefin selected. The olefin feed as well as the product, in the reaction zone will be maintained in the vapor phase. Generally the vapor phase catalytic hydration of $C_2$–$C_4$ olefins will require temperatures between about 200° F. to 700° F. and elevated pressures of about 100 to 3500 p. s. i. g.

The present process is particularly applicable to the production of diisopropyl ether by direct catalytic hydration of propylene at temperatures between 200° F. and 700° F. and at elevated pressures of about 100 to 2500 p. s. i. g. with a high ratio of propylene to water vapor in the feed. The types of catalyst used in the reaction zone are those solids which have acid properties desirable for synthesis of alcohols, but preferably modified to promote dehydration of the alcohol to ether; for example, mixed catalysts like tungsten-dioxide-tungsten trioxide-alumina ($W_2O_5$—$Al_2O_3$) or tungsten oxides=titania ($W_2O_5$—$TiO_2$). Other conventional hydration catalysts may be used. Many which can be used are shown in the prior art. Suitable proportions for the reactants and catalysts in terms of velocity of the feed stream are in the order of 1000–10,000 volumes of gas feed at standard conditions per volume of catalyst per hour.

Unexpectedly, it has been discovered that the liquid hydrocarbon solvent used, under the specific elevated temperatures and pressures in the scrubbing or absorption zone, effectively separates ether, alcohol and polymer products from a gaseous reaction product stream containing large amounts of unreacted olefin, inert hydrocarbon and water vapor. The effective temperatures and pressures in the absorption zone are now found to be of the order of 200°–700° F. and 100–3500 p. s. i. g. The temperatures and pressures in the absorption zone are advantageously only slightly lower than those found in the hydration reaction zone.

A flow sheet diagram is attached for describing a preferred embodiment of the invention.

In the process shown by the flow diagram, the propylene feed is supplied from line 1 by compressor 2 to the reactor 3. The required amount of water reactant from line 4 is vaporized and superheated in heater 5 and passed by line 6 into the reactor 3. A major part of the hydrocarbon reactant entering the reactor 3 comes from the recycle stream which enters reactor 3 through line 7; and the method of obtaining these recycle streams will be described in further detail.

The reaction product mixture at elevated temperatures and pressures is passed directly from the outlet end of the reactor 3 through line 8 to a high pressure and high temperature absorber 9. The hydrocarbon naphtha fraction solvent is supplied to an upper part of the scrubber tower 9 through line 10 under high pressure and at suitable temperatures to maintain a high temperature and pressure in the absorber, preferably temperatures and pressures close to those prevailing in the reactor 3. Under such conditions the hydrocarbon solvent supplied in suitable quantity can scrub out practically all the propylene polymer, nearly all the ether and most of the alcohol, while leaving most of the inert gases and unreacted propylene in the gaseous phase to be removed overhead from the absorber through line 11. A portion of this overhead unabsorbed gas is to be bled from the system through flow outlet line 12 to keep inert propane or other hydrocarbons from accumulating in the system. This bleed gas can be sent to fractionating columns for reconcentrating the propylene to about the same concentration as in the fresh feed, in which case it would again become a part of the fresh hydrocarbon feed to the reactor. The remaining portion of the overhead unabsorbed gas relatively rich in propylene, alcohol and water is passed from overhead line 11 through line 13 to booster compressor 14 for recycling through line 7 into the reactor 3.

The scrubber solution of extracted products is withdrawn from the bottom of absorber 9 through valved line 15 to the stabilizer tower 16 where under partially reduced pressure and temperature the hydrocarbon solution is stripped of low-boiling hydrocarbons and a substantial amount of absorbed water.

The overhead vapors from stabilizer tower 16 may be partially condensed in condenser 17 and refluxed by means of line 18. The net overhead product in excess of the reflux containing propylene, propane, and water is returned through line 19 and compressor 20 to the recycle line 7 entering reactor 3. The bottoms withdrawn from the stabilizer 16 by line 21 is the naphtha or gasoline hydrocarbon solution containing ether, alcohol and polymer with no more than a trace of water. This gasoline solution is satisfactory as such for use as a blending stock for improving the octane number of motor or aviation fuels.

To illustrate, a specific operative embodiment is given in the following example:

EXAMPLE

A typical fresh hydrocarbon feed is a $C_3$ cut containing 80% propylene and about 20% propane. Enough water vapor is added to the reactor, in addition to that present in the recycle gas from the absorber, to make the molal ratio of propylene to water in the combined feed (fresh+recycle) equal to 4. The reactor contains a hydration catalyst comprising tungsten dioxide, tungsten trioxide and alumina in a weight ratio of 25:25:50. An optimum gas velocity is 2000 cu. ft. per cu. ft. of catalyst per hour at standard conditions.

In the present specific example direct hydration of propylene is conducted at 300° F. and 1000 p. s. i. g. pressure. Under these conditions and at a propylene-water ratio in the total feed gas of 4, hydration occurs in the vapor phase. The conversion of propylene per pass through the reactor to isopropyl ether will amount to 15%, to isopropyl alcohol 3% and to propylene polymers 2%.

The effluent product passing continuously from the reaction zone as vapor is subjected to scrubbing in an absorber tower with gasoline base stock. Per 100 lb. mols of propylene in the fresh hydrocarbon feed, there will be close to 880 lb. mols of reactor effluent. This quantity of reactor effluent will be scrubbed countercurrently with 250 gallons of gasoline base stock which might be hydroformate containing aromatics, isoparaffins, naphthenes, and relatively small amounts of olefins. The hydrocarbon solvent used for scrubbing should be preferably low in olefinic components and in components lower boiling than butane. Most suitable conditions in the absorber are temperatures and pressures only slightly lower than those maintained in the reaction zone. In the specific example the absorber conditions are 280° F. and 985 p. s. i. g. pressure. Eighty percent of the propylene entering the process in the fresh hydrocarbon feed is converted to hydration and polymerization products. Per 100 lb. mols of propylene in the fresh feed, there will be produced 30 lb. mols of isopropyl ether, 12 lb. mols of isopropyl alcohol and 8 lb. mols of polymer (as propylene).

In the specific example, under the absorption conditions given, all the propylene polymer, nearly all the ether, and most of the alcohol is scrubbed out with the hydrocarbon gasoline base stock in the absorber, although about 6% of the $C_3$ hydrocarbons and a small amount of water will also be absorbed from the reactor vapor. To overcome this difficulty, the extract or gasoline solution is fractionated at reduced temperature and pressure to strip out essentially all the absorbed propane and propylene together with most of the water. The recovered $C_3$ hydrocarbons and small amount of water may be compressed to constitute a minor recycle stream to the reactor. After stabilization at a temperature of about 275° F. under a pressure of about 200 p. s. i. g., the ether-alcohol mixture in gasoline should contain less than 0.3 volume percent of water.

Twenty percent of the propylene entering the process in the fresh feed stream is removed in the bleed gas after the absorber to purge propane from the system which also enters in the fresh hydrocarbon feed. The bleed gas may then be subjected to fractionation, if desired, in order to reconcentrate propylene for return to the hydration process.

A typical composition of the vapor from the absorber recycled to the reactor is as follows based on 100 mols of propylene in the fresh hydrocarbon feed:

Table 1

| Composition of recycle gas: | Lb. mols |
|---|---|
| Propylene | 300 |
| Propane | 375 |
| Ether | 1.5 |
| Alcohol | 6 |
| Water | 55.5 |
| Total | 738 |

To produce blending stock for improving the octane number of motor gasoline the hydroformate selected as the scrubbing agent has a boiling range between 150° and 310° F. approximately and an A. P. I. gravity of about 45. To obtain a blend stock for aviation fuel, an alkylate containing only about 15% virgin naphtha (with or without aromatics) having an approximate boiling range of 150–310° F. and an A. P. I. gravity of about 68 may be employed to absorb the hydration products. In either case the resulting stabilized blending stock will contain a high concentration of isopropyl ether and some isopropyl alcohol, and may then be added in the desired proportions to gasoline; for example, in proportions between 5% and 10%. Alternatively, the ether-containing hydrocarbon extract may be refractionated to produce purified isopropyl ether free from alcohol.

This application is a continuation-in-part of application Serial No. 451,579, filed August 23, 1954 and now abandoned.

What is claimed is:

1. A process for producing a hydrocarbon solution containing isopropyl ether which comprises subjecting a mixture containing a substantial excess of gaseous propylene to vapor phase reaction with water vapor in a reaction zone in the presence of a solid hydration catalyst at temperatures in the range of 200° F. to 700° F. and at pressures in the range of 100 to 2500 p. s. i. g., passing a resulting gaseous product from the reaction zone into an absorption zone, contacting said gaseous product with a liquid naphtha hydrocarbon fraction solvent at substantially the temperature and pressure of hydration to effect absorption of the ether and alcohol products, separating unabsorbed gases from the hydrocarbon solution containing the ether and recycling a major portion of the separated unabsorbed gases substantially under hydration pressure to said reaction zone.

2. The process defined in claim 1, wherein the gaseous product from the reaction zone contains principally unreacted propylene with isopropyl ether, minor amounts of isopropyl alcohol and polymer, and wherein the liquid hydrocarbon extract of the ether, alcohol and polymer is subjected to fractionation under lowered temperatures and pressures to strip out absorbed gases such as propane and propylene with most of the water.

3. The process defined in claim 1, wherein a portion of the gases containing unreacted propylene and any inert gases present unabsorbed by the liquid hydrocarbon is purged to prevent buildup of the inert gases in the reaction and absorption zones.

4. The process as defined in claim 1, wherein temperatures and pressures in the absorption zone are in the range of 200° to 700° F. and 100 to 2500 p. s. i. g. but slightly lower than those maintained in the reaction zone in order to preferentially absorb the ether product while maintaining the unreacted propylene under high pressure for recycling.

5. A process of producing a fuel blending stock containing isopropyl ether which comprises passing a mixture containing gaseous propylene and water vapor in a mole ratio of about 4:1 through a reaction zone in the presence of a solid tungsten oxide hydration catalyst at temperatures of about 300° F. and at pressures in the range of about 1000 p. s. i. g., passing the resulting gaseous product containing isopropyl ether, isopropyl alcohol, unconverted olefin and water from the reaction into an absorption zone, contacting said gaseous product substantially under reaction zone pressure with a liquid naphtha fraction solvent to effect absorption of the ether and alcohol products, separating unabsorbed gases substantially under reaction zone pressure from said solvent, recycling a major portion of the separated gases substantially under reaction zone pressure to said reaction zone, and fractionating the remaining liquid naphtha fraction solvent containing absorbed ether to separate low boiling hydrocarbons, inert gases and a substantial amount of water from the remaining ether-containing naphtha.

References Cited in the file of this patent

UNITED STATES PATENTS

| | | |
|---|---|---|
| 1,873,536 | Brown et al. | Aug. 23, 1932 |
| 2,178,186 | Oldershaw | Oct. 31, 1939 |
| 2,367,479 | Wolk | Jan. 16, 1945 |